United States Patent
Kayanuma et al.

(10) Patent No.: US 7,100,859 B2
(45) Date of Patent: Sep. 5, 2006

(54) HOLDER DEVICE OF RECORDING PAPER ROLL

(75) Inventors: Yasunobu Kayanuma, Saitama (JP); Akimasa Kaya, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1 day.

(21) Appl. No.: 10/366,366

(22) Filed: Feb. 14, 2003

(65) Prior Publication Data

US 2003/0160833 A1    Aug. 28, 2003

(30) Foreign Application Priority Data

Feb. 22, 2002    (JP)    ............................... 2002-047071

(51) Int. Cl.
G11B 23/07    (2006.01)

(52) U.S. Cl. .................................... 242/348; 242/571.6

(58) Field of Classification Search ............. 242/571.6, 242/348, 349, 564; 279/2.19, 2.2
See application file for complete search history.

(56) References Cited

U.S. PATENT DOCUMENTS 2,171,800 A * 9/1939 Mann ....................... 242/571.6
3,355,121 A * 11/1967 Wright ..................... 242/571.6
3,544,016 A * 12/1970 Rushton et al. .......... 242/571.6
3,801,033 A * 4/1974 Sanderson ............... 242/571.6

FOREIGN PATENT DOCUMENTS

| JP | 5-68999 | 9/1993 |
| JP | 5-294523 | 11/1993 |
| JP | 2001-106436 | 4/2001 |
| JP | 2001-171868 | 6/2001 |
| JP | 2001-180848 | 7/2001 |
| JP | 2002-274705 | 9/2002 |

* cited by examiner

Primary Examiner—John Q. Nguyen
(74) Attorney, Agent, or Firm—Sughrue Mion, PLLC

(57) ABSTRACT

A holder device for holding a recording paper roll includes a pair of holders. A first holder has a first fitting portion with an anti-slip device and a first engagement portion. The anti-slip device has two claw members for forward rotation symmetrically disposed each other with respect to a center of rotation of the recording paper roll, two claw members for backward rotation disposed likewise, and springs biasing each claw member to an engagement position. When the first holder rotates in a forward or backward direction, the claw members for forward rotation or for backward rotation move to the engagement positions, respectively, in order to prevent a slip of the recording paper roll. An edge of each claw member is tapered along an attachment direction of the recording paper for easy attachment.

16 Claims, 6 Drawing Sheets

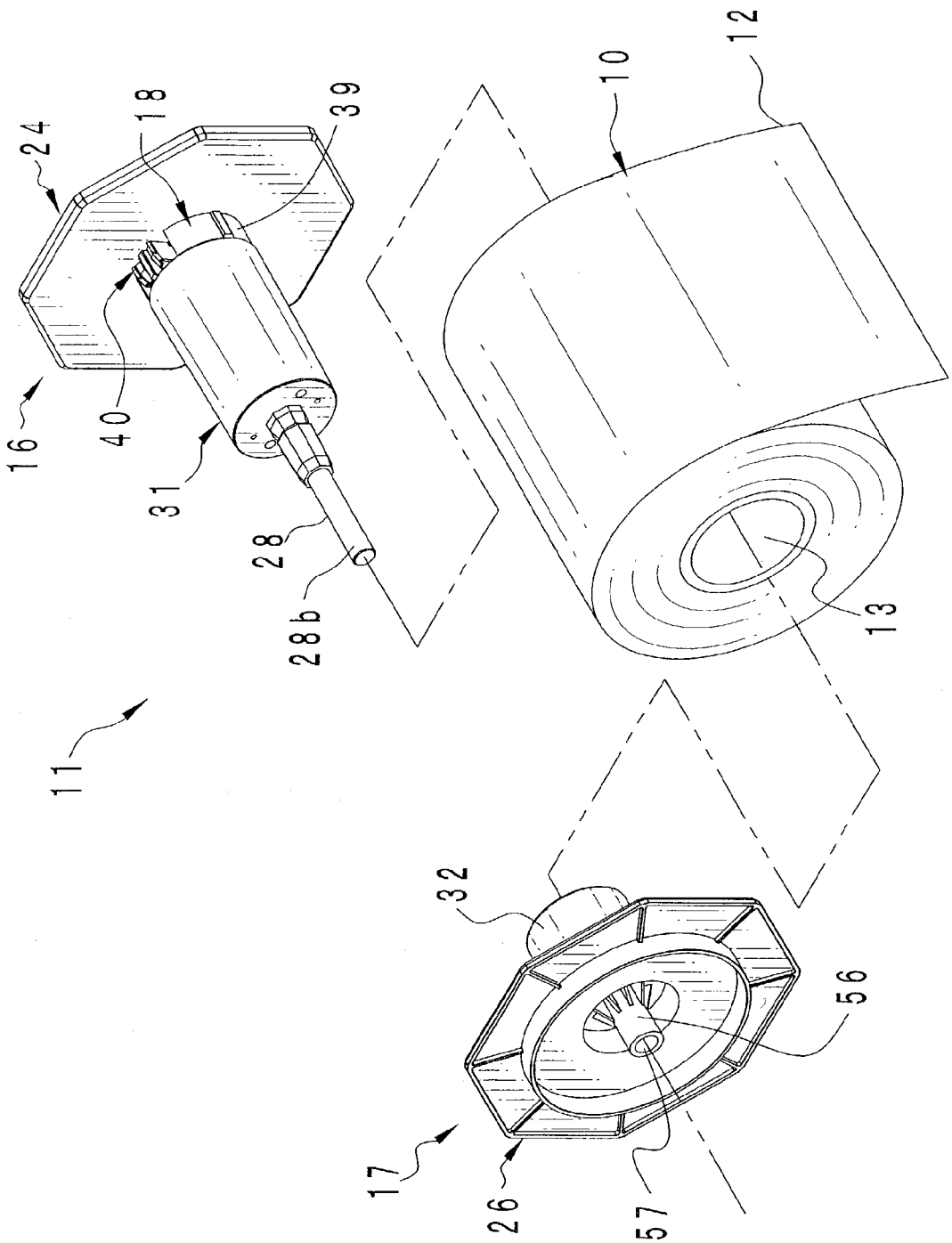

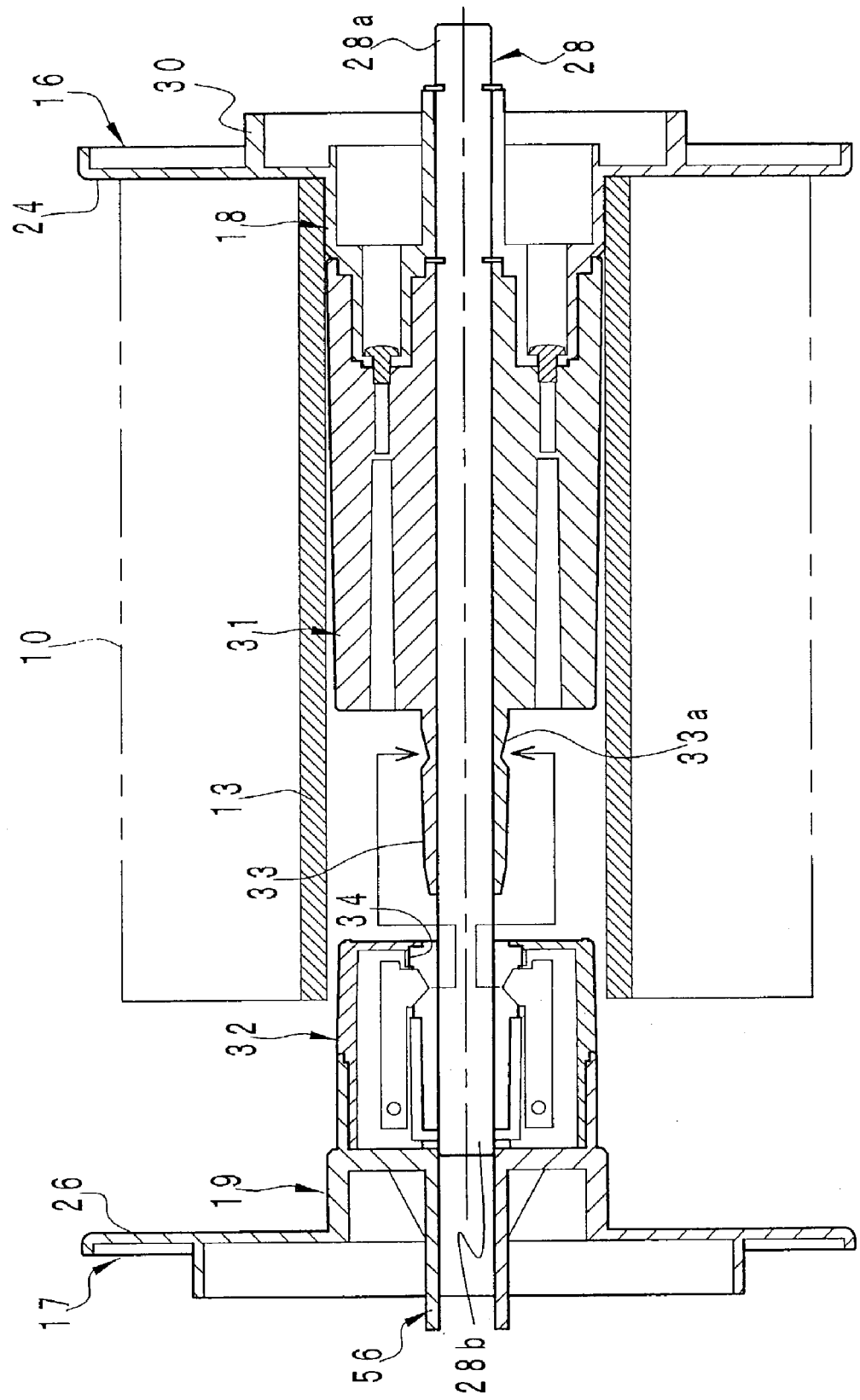

HOLDER DEVICE OF RECORDING PAPER ROLL

BACKGROUND OF THE INVENTION

1. Field of the Invention

The present invention relates to a holder device for holding a recording paper roll composed of a heat-sensitive recording paper, a photographic paper, or the like.

2. Background Arts

A photographic printer and a color thermal printer use a recording paper roll. The recording paper roll consists of a tubular spool shaft made of paper or plastic and a continuous recording paper wound thereon. The continuous recording paper is cut into a sheet of regulation-sized paper after printing.

A paper-feeding section of the printer is provided with a holder device of the recording paper roll. When the recording paper roll is set on the holder device, a pair of holders rotatably holds the recording paper roll. Each holder has a fitting portion which fits an inner surface of the spool shaft, and a rotational shaft. The recording paper roll is driven by a motor, for example, provided in the printer.

As a well-known drive system of the recording paper roll, there is a drive gear system in which a drive gear provided in one of holders rotates the spool shaft of the recording paper roll. This system, however, has a disadvantage in that if the holder loosely fits the spool shaft, the holder slips on the inner surface of the spool shaft, so that rotation of the holder is hardly transmitted to the recording paper roll.

In order to prevent a slip of the holder, there is an effective way in that a key groove is formed in the plastic spool shaft and a key provided in the holder is fitted therein. In a case where the paper spool shaft is used with environmental consciousness, however, it is impossible to form the key groove in terms of accuracy in molding.

To prevent a slip on the paper spool shaft, it is effective to provide claw members in the holder and engage the claw members with the inner surface of the spool shaft. In this case, the claw members have to be strongly biased toward the inner surface of the spool shaft. Thus, there is a disadvantage in that bias makes it difficult to attach the recording paper roll to the holder.

SUMMARY OF THE INVENTION

An object of the present invention is to provide a holder device that holds a recording paper roll using a paper spool shaft without a slip of a holder on an inner surface of the spool shaft.

Another object of the present invention is to provide a holder device to which a recording paper roll is easily attached.

To achieve the above objects, a holder device according to the present invention comprises a shaft portion passing through a spool shaft of a recording paper roll, claw members attached to the shaft portion, and springs biasing the claw members toward first positions. The claw members are movable between the first position in which the claw members protrude from an inner surface of the spool shaft into the spool shaft, and a second position in which the claw members do not protrude from the inner surface. When the recording paper roll is attached to the holder device, the claw members make in contact with the inner surface of the spool shaft. Rotation of the shaft portion produces frictional force between the claw members and the inner surface of the spool shaft. The frictional force makes the claw members move to the first position, so that the claw members are engaged in the spool shaft to prevent a slip of the recording paper roll.

The claw members are symmetrically disposed with respect to a center of rotation of the shaft portion. Thus, a couple of force generated by the claw members rotates the recording paper roll in the same direction as the shaft portion.

A taper surface is formed at a tip of each claw member in an axial direction so as to easily attach the recording paper roll to the shaft portion.

The claw members have first claw members and second claw members. The first claw members move to the first positions only when the shaft portion rotates in a first direction, and the second claw members move to the first positions only when the shaft portion rotates in a second direction opposite to the first direction.

In a preferred embodiment, the holder device includes a first holder component and a second holder component engaged with each other. The first holder component comprises a shaft portion passing through a spool shaft of a recording paper roll, claw members attached to the shaft portion, springs for biasing the claw members toward first positions.

The first holder component further comprises a first flange making in contact with one side face of the recording paper roll. The second holder component comprises a second flange making in contact with the other side face of the recording paper roll. When the first and second holder components are engaged with each other, the recording paper roll is held between the first and second flanges with edges of the recording paper neatly aligned by the first and second flanges.

BRIEF DESCRIPTION OF THE DRAWINGS

The above object and advantages of the present invention will become apparent from the following detailed descriptions of the preferred embodiments when read in association with the accompanying drawings, which are given by way of illustration only and thus are not limiting the present invention. In the drawings, same reference numerals designate like or corresponding parts throughout the several views, and wherein:

FIG. 2 is a perspective view of the holder device from which the recording paper roll is detached;

FIG. 3 is a sectional view of the holder device;

DETAILED DESCRIPTION OF THE EMBODIMENTS

Figure 1:
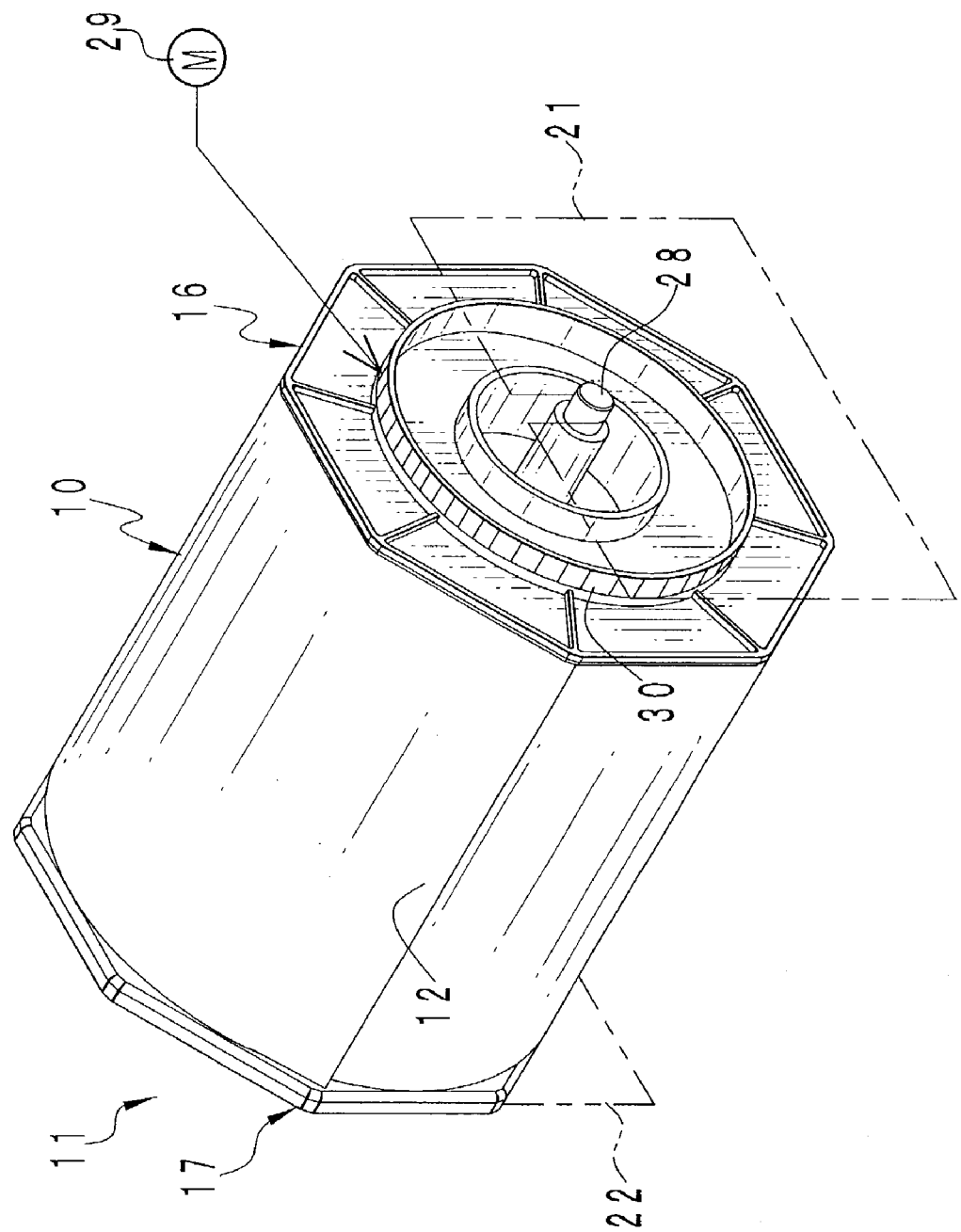
FIG. 1 is a perspective view of a holder device on which a recording paper roll is attached.

Referring to FIGS. 1 and 2, a recording paper roll 10 comprises a tubular spool shaft 13 and a continuous recording paper 12 wound thereon. The spool shaft 13 is made of cardboard. When the recording paper roll 10 is loaded in a paper-feeding section of a printer, as shown in FIG. 1, a holder device 11 is attached to both ends of the recording paper roll 10.

The holder device 11 comprises a pair of holders, that is, a first holder 16 and a second holder 17. The first holder 16 has a flange 24 to make contact with one end of the recording paper roll 10, a first fitting portion 18 fitted into an inner surface of the spool shaft 13, and a first engagement portion 31 inserted into the inside of the spool shaft 13. The second holder 17 has a flange 26 making contact with the other end of the recording paper roll 10, a second fitting portion 19 (refer to FIG. 3) fitted into the inner surface of the spool shaft 13, and a second engagement portion 32 coupled to the first engagement portion 31 inside the spool shaft 13. The flanges 24 and 26 hold both ends of the recording paper roll 10 to neatly align edges of the recording paper 12. Thus, the flanges 24 and 26 prevent the recording paper 12 from drawing out on the skew or jamming.

A rotational shaft 28 is fixedly disposed at a center of the first holder 16. A shaft hole 57 is formed in the second holder 17 to penetrate the rotational shaft 28. As shown in FIG. 3, one end 28a of the rotational shaft 28 protrudes from the flange 24. When the first holder 16 and the second holder 17 are coupled with each other, the other end 28b protrudes from the flange 26 through the shaft hole 57. Both the ends 28a and 28b are rotatably supported by supporting members 21 and 22 (refer to FIG. 1) provided in the paper-feeding section of the printer.

The first engagement portion 31 includes an engagement shaft 33. A core sleeve 34 into which the engagement shaft 33 is fitted is formed in the second engagement portion 32. When the first and second holders 16 and 17 are attached to the recording paper roll 10, the engagement shaft 33 is inserted into the core sleeve 34, and the first and second engagement portions 31 and 32 are latched inside the spool shaft 13 with a latch device described later.

A drive gear 30 is provided in the flange 24 of the first holder 16. The drive gear 30 is connected to a drive motor 29 of the printer. Upon driving the drive motor 29, the recording paper roll 10 rotates together with the first and second holders 16 and 17. Since the present invention does not use a drive roller which is in contact with an outer surface of the recording paper roll 10, it is possible to rewind the recording paper roll 10 without coming loose.

Figure 4A:
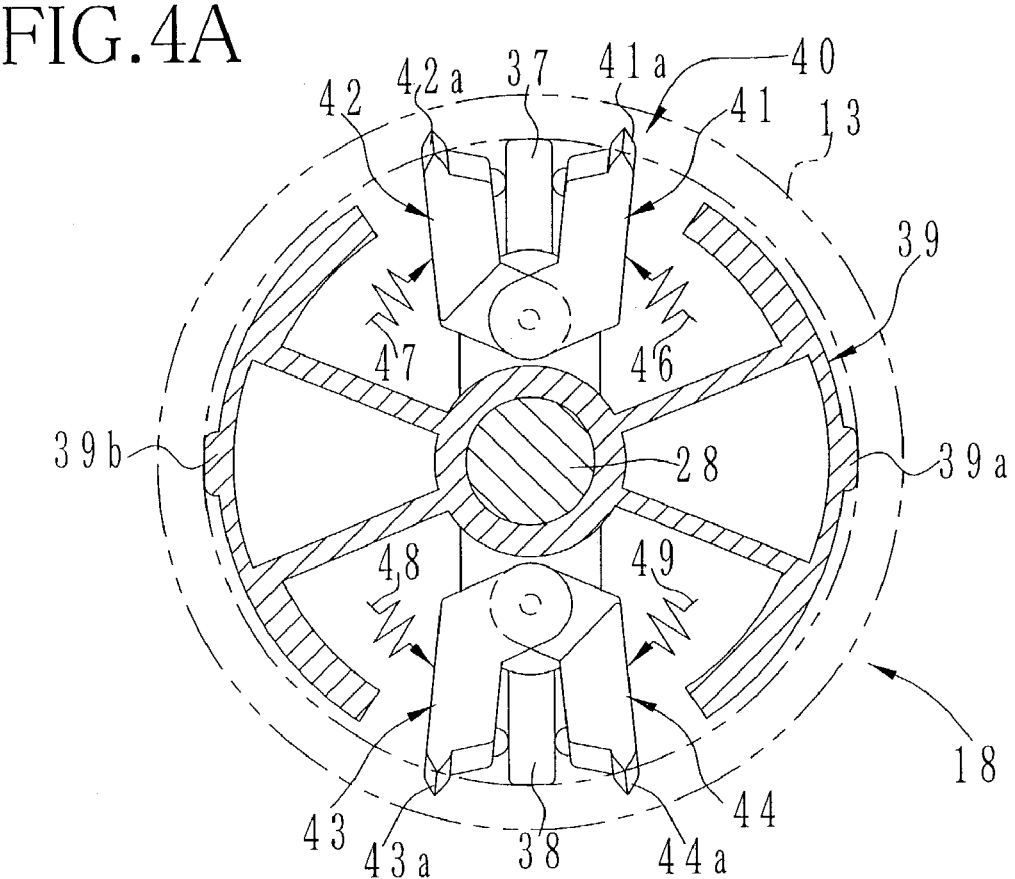
FIG. 4A is a schematic side view of a first fitting portion when claw members are in initial positions.

Referring to FIG. 4A, the first fitting portion 18 comprises a holder frame 39 and an anti-slip device 40 which prevents the holder device 11 from slipping on the inner surface of the spool shaft 11. Projections 39a and 39b are formed in an outer surface of the holder frame 39. The anti-slip device 40 has four claw members 41 to 44 and four springs 46 to 49 which bias each of the claw members 41 to 44. Claws 41a to 44a engaged in the inner surface of the spool shaft 13 are formed at tips of the claw member 41 to 44, respectively. When the first fitting portion 18 and the first engagement portion 31 are inserted into the spool shaft 13, the projections 39a and 39b and the claws 41a to 44a are in contact with the inner surface of the spool shaft 13.

The claw members 41 and 43 are symmetrically disposed each other with respect to the rotational shaft 28. When the rotational shaft 28 rotates in a forward direction (in a clockwise direction), the claw members 41 and 43 are engaged in the spool shaft 13 and generate a couple of force, so that the recording paper roll 10 rotates in the forward direction. The claw members 42 and 44 symmetrically disposed each other with respect to the rotational shaft 28 are engaged in the spool shaft 13 and generate a couple of force, when the rotational shaft 28 rotates in a backward direction (in a counterclockwise direction), so that the recording paper roll 10 rotates in the backward direction.

Figure 4B:
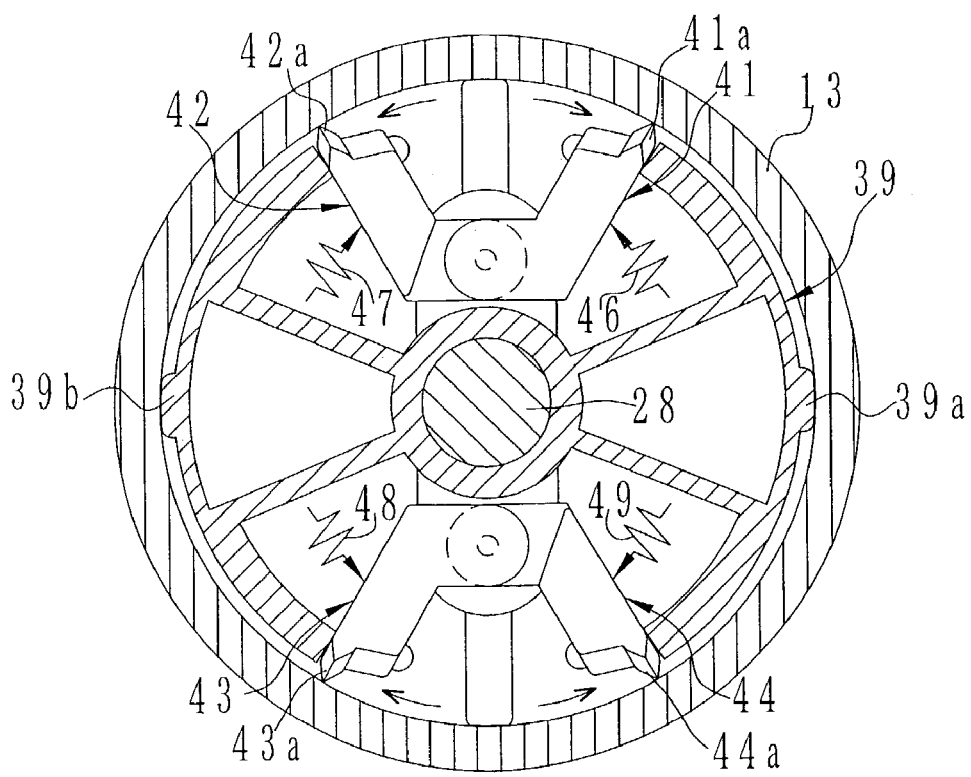
FIG. 4B is a schematic side view of the first fitting portion when the claw members are in evacuation positions.

Each of the claw members 41 to 44 is rotatable between an engagement position shown in FIG. 4A, in which each claw 41a to 44a is most deeply embedded in the inner surface of the spool shaft 13, and an evacuation position shown in FIG. 4B, in which each claw 41a to 44a evacuates to the inside of an internal diameter of the spool shaft 13. The springs 46 to 49 bias the claw members 41 to 44 toward the respective engagement positions. The springs 46 to 49 make the claws 41a to 44a contact with the inner surface of the spool shaft 13, but do not have such a strong bias as to embed the claws 41a to 44a in the inner surface of the spool shaft 13.

Regulatory members 37 and 38 bump against claw members 41 to 44 in order to restrict a rotational range of the claw members 41 to 44. The claw members 41 to 44 stop in the engagement positions due to the regulatory members 37 and 38.

At first, the claw members 41 to 44 are in the engagement positions. When the recording paper roll 10 is attached to the first holder 16, the inner surface of the spool shaft 13 presses the claw members 41 to 44, so that the claw members 41 to 44 rotate toward the evacuation positions against the bias of the springs 46 to 49. Since the bias of the springs 46 to 49 is weak, the claw members 41 to 44 rotate with weak stress.

The tip of each claw 41a to 44a is tapered along a direction of the rotational shaft 28. Even if the claw members 41 to 44 are in the engagement positions, edges of the claws 41a to 44a on a side of engagement portion 31 do not make contact with the inner surface of the spool shaft 13. Thus, the recording paper roll 10 is easily attached to the first holder 16 because the claws 41a to 44a do not get snagged on an end face of the spool shaft 13.

Figure 5A:
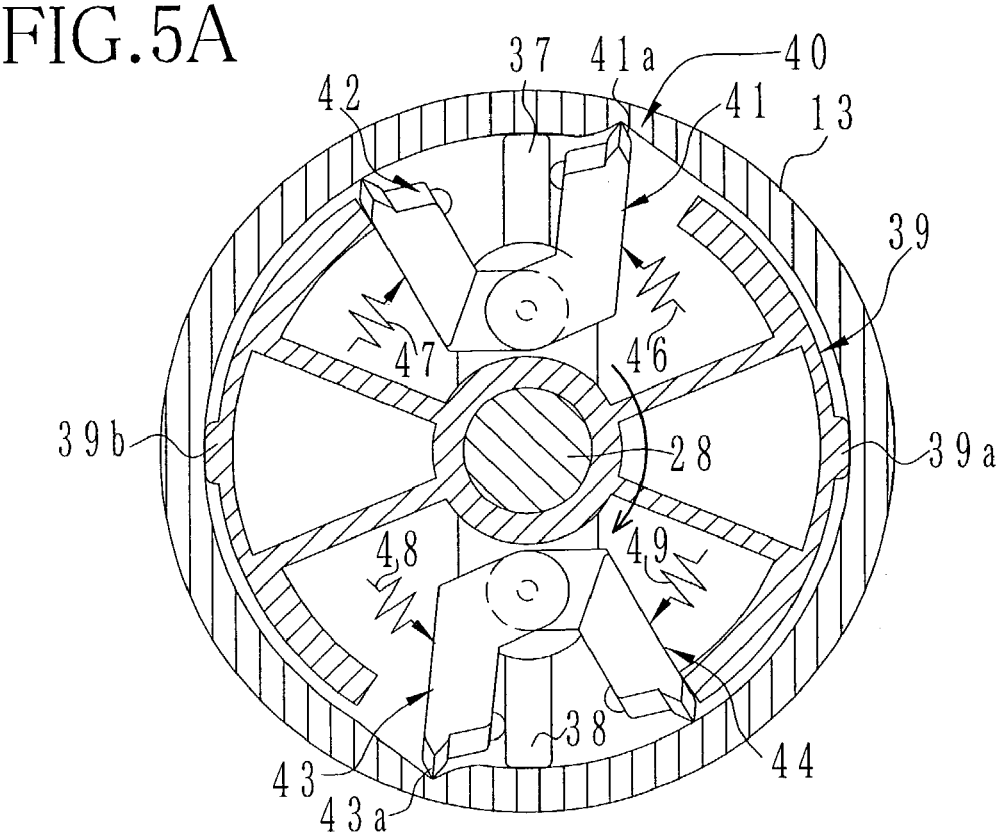
FIG. 5A is a schematic side view of the first fitting portion when the holder device rotates in a clockwise direction.

When the first holder 16 rotates in the forward direction (in the clockwise direction) after the spool shaft 13 of the recording paper roll 10 is attached to the first holder 16, the claw members for forward rotation 41 and 43 rotate with making in contact with the inner surface of the spool shaft 13 (refer to FIG. 5A). At this time, the claw members 41 and 43 rotate toward the engagement positions by frictional force produced between the claw members 41 and 43 and the spool shaft 13. Though frictional force is produced between the claw members for backward rotation 42 and 44 and the spool shaft 13 too, the claw members 42 and 44 remain in the evacuation positions because the frictional force points in the direction toward the evacuation position. The holder device 11 does not slip on the inner surface of the spool shaft 13 due to engagement of the claw members 41 and 43 in the inner surface of the spool shaft 13.

Figure 5B:
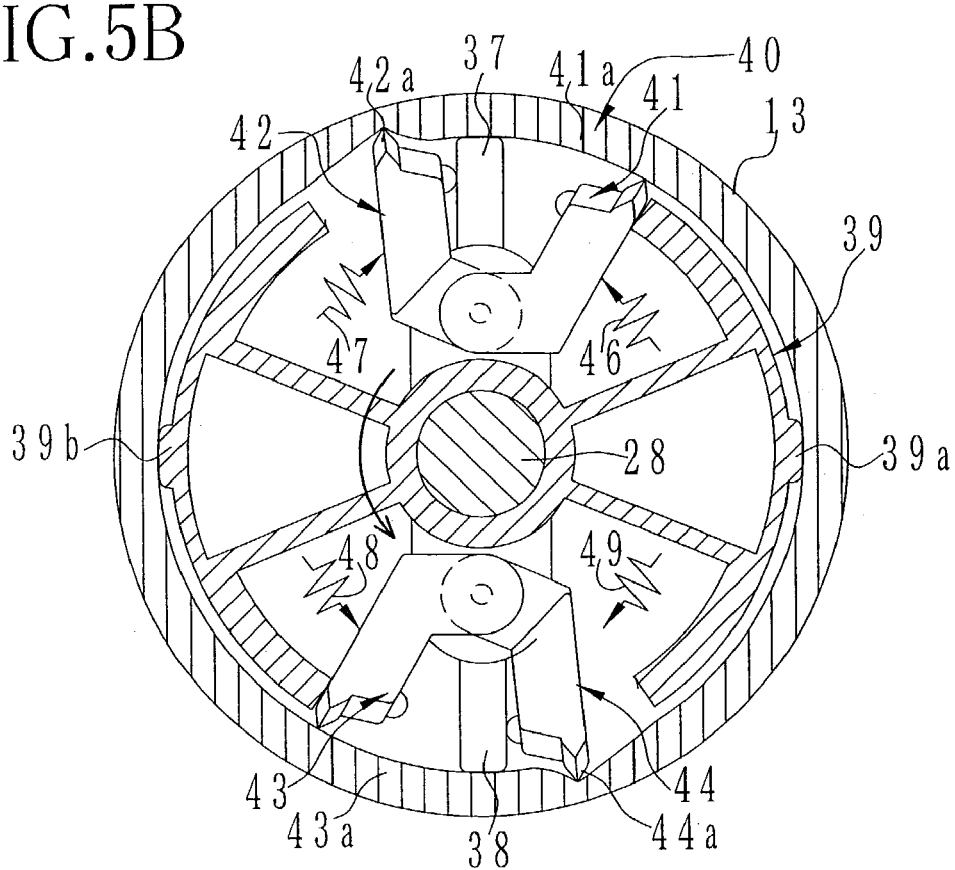
FIG. 5B is a schematic side view of the first fitting portion when the holder device rotates in a counterclockwise direction.

On the other hand, when the first holder 16 rotates in the backward direction (in the counterclockwise direction), the claw members for backward rotation 42 and 44 rotate with making in contact with the inner surface of the spool shaft 13 (refer to FIG. 5B). At this time, as in the case of forward rotation, the claw members for backward rotation 42 and 44 rotate toward the engagement positions by frictional force produced between the claw members 42 and 44 and the spool shaft 13. The claw members for forward rotation 41 and 43 remain in the evacuation positions. In this case, engagement of the claw members for backward rotation 42 and 44 in the spool shaft 13 prevents the holder device 11 from slipping.

Figure 6A:
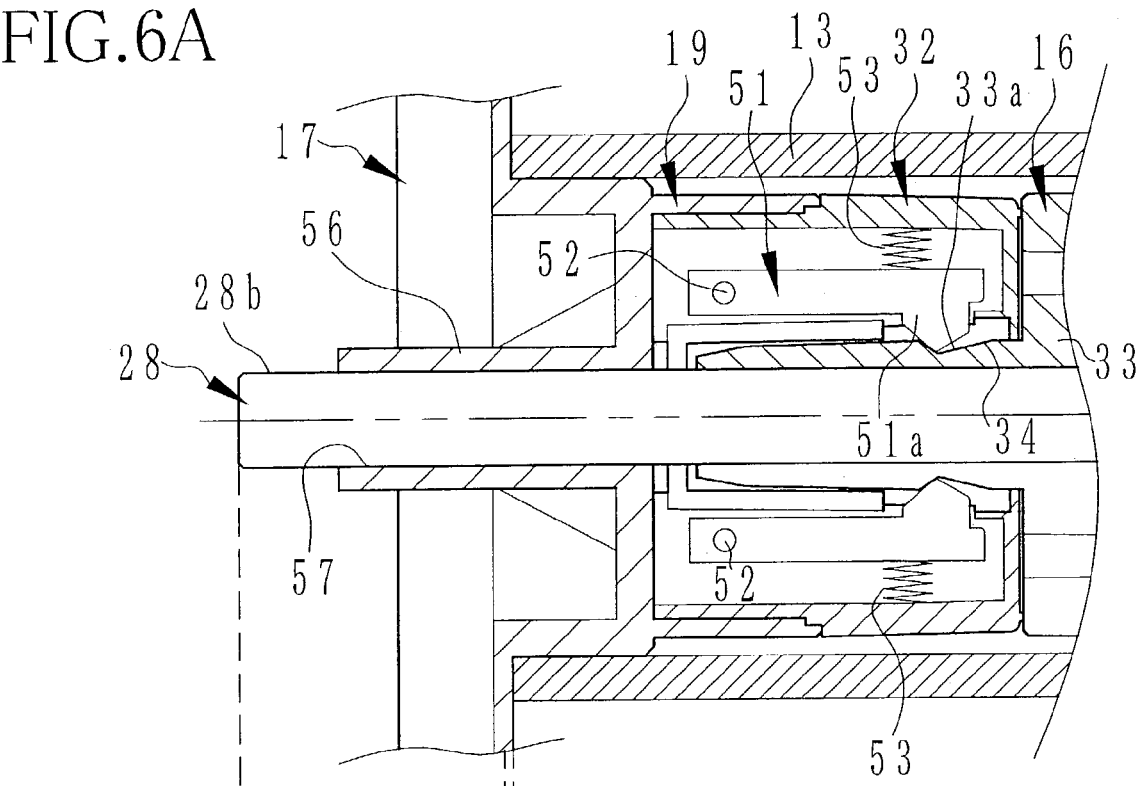
FIGS. 6A and 6B are sectional views of a latch device when their engagement points are shifted each other by a distance "d" in a direction of a rotational shaft.
Figure 6B:
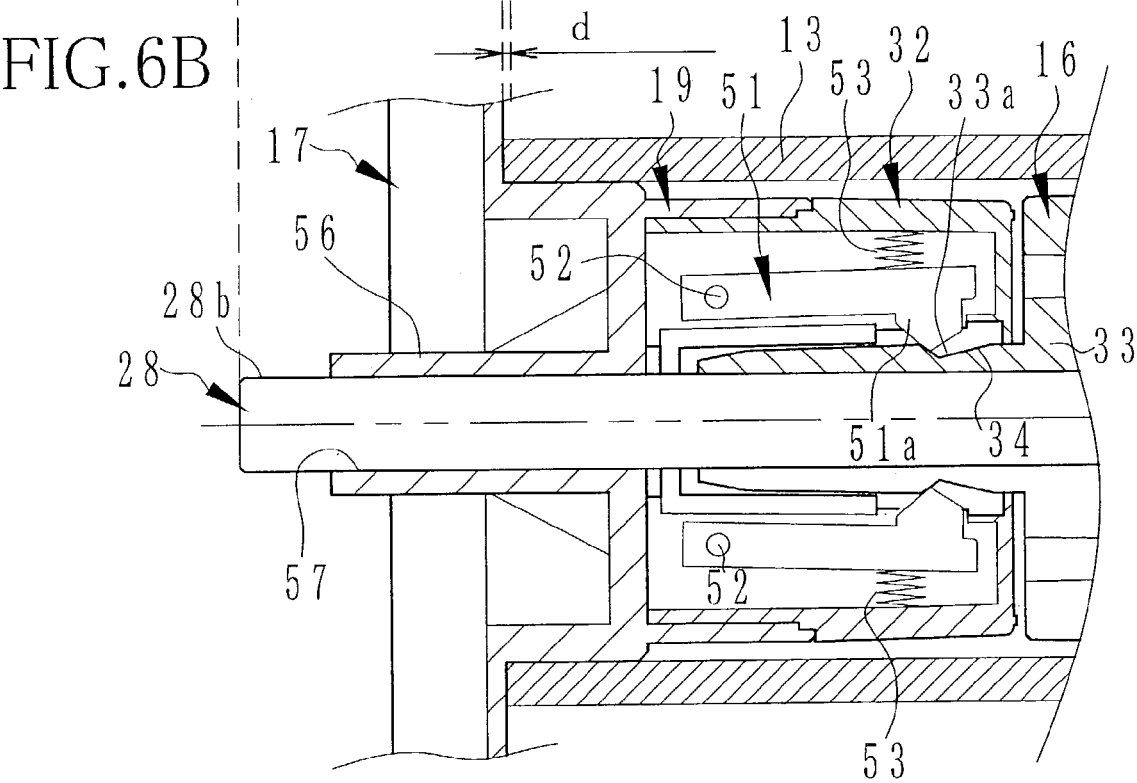

Referring to FIGS. 6A and 6B, the latch device comprises two latch members 51, two coil springs 53, and a groove 33a. The latch member 51 provided inside the second engagement portion 32 is rotatable about an axis 52. The coil spring 53 biases the latch member 51 toward a direction in which a projection 51a formed at an end of the latch member 51 projects into the core sleeve 34. The groove 33a is formed in an outer periphery of the engagement shaft 33. When the engagement shaft 33 is inserted into the core sleeve 34, the projections 51a of the latch members 51 are engaged with the groove 33a in order that the first holder 16 and the second holder 17 may not be detached from each other during rotation.

A shaft holder 56 in which the shaft hole is formed to penetrate the rotational shaft 28 is provided in the second holder 17. The shaft holder 56 and the rotational shaft 28 decide the center of rotation of the first and second holders 16 and 17. The shaft holder 56 and the rotational shaft 28 allow displacement of the second holder 16 to an axial direction. Thus, even if a width of the recording paper roll 10 varies by a distance of "d" due to variation in length and shape of the spool shaft 13, and the engagement point of the first and second holders 16 and 17 is slightly displaced, the center of rotation does not vary. An allowable range of displacement of the engagement point may be properly decided in accordance with tolerance of the spool shaft 13.

Operation of the holder device will now be described. The recording paper roll 10 is attached to the holder device 11, when the first and second holders 16 and 17 are applied to both the ends of the recording paper roll 10 and are fitted with each other until the first and second engagement portions 31 and 32 latch. The latch decides positions of the first and second holders 16 and 17 in the axial direction.

In the first fitting portion 18 of the first holder 16, the claw members 41 to 44 jut over the outer surface of the holder frame 39, but the claw members 41 to 44, as shown in FIG. 4B, rotate to the evacuation position by a press of the inner surface of the spool shaft 13 when attaching the recording paper roll 10 thereto. The claw members 41 to 44 rotate against bias of the springs 46 to 49, but it is easy to attach the recording paper roll 10 because the stress of the bias is weak.

Then, the recording paper roll 10 is set on the paper-feeding section of the printer. Upon driving the motor 29, the holder device 11 starts rotating. Depending on the rotational direction of the holder device 11, the claw members for forward rotation 41 and 43 or the claw members for backward rotation 42 and 44 which are provided in the first holder 16 start rotating toward the engagement positions, and are engaged in the inner surface of the spool shaft 13. Therefore, rotation of the motor 29 is reliably transmitted to the recording paper roll 10 without the slip of the first holder 10.

The rotational shaft 28 and the shaft holder 56 decide the center of rotation of the first and second holders 16 and 17. Accordingly, the recording paper roll 10 properly rotates without eccentricity even in a case where the width of the recording paper roll 10 slightly varies due to the variation in length of the spool shaft 13 and in shape of its end faces.

In the above embodiment, both the claw members for forward rotation and for backward rotation are provided. However, only the claw members for one rotational direction may be provided in a case where the recording paper roll rotates only in one direction via the holder, such as where a drive roller abutting on an outer surface of the recording paper roll 10 rotates it in feeding, and the holder device rotates the recording paper roll only in rewinding.

The holder device of the above embodiment is provided with two claw members for forward rotation which are symmetrically disposed with respect to the center of rotation, and two claw members for backward rotation disposed likewise. However, it is also possible to provide more than two claw members for forward rotation or more than two claw members for backward rotation. Moreover, the claw members may be provided in a not-symmetrical manner.

Although the present invention has been described with respect to the preferred embodiments, the present invention is not to be limited to the above embodiments but, on the contrary, various modifications will be possible to those skilled in the art without departing from the scope of claims appended hereto.

What is claimed is:

1. A holder device holding a recording paper roll having a tubular spool shaft and a continuous recording paper wound thereon and rotated together with said recording paper roll by a motor drive, said holder device comprising:
    a shaft portion passing through said spool shaft and rotated by said motor drive;
    claw members attached to said shaft portion, each of said claw members being movable between a first position in which said claw members protrude into an inner surface of said spool shaft, and a second position in which said claw members are away from said first position with respect to said inner surface of said spool shaft; and
    springs for biasing said claw members toward said first positions, said claw members being in contact with said inner surface of said spool shaft when said recording paper roll is attached to said holder device,
    wherein the claw members are disposed such that a rotation of said shaft portion produces a frictional force between said claw members and said inner surface of said spool shaft and engages said claw members with said spool shaft to move said claw members to said first positions,
    wherein said claw members have first claw members disposed such that said first claw members move to said first positions only when said shaft portion rotates in a first direction, and second claw members disposed such that said second claw members move to said first positions only when said shaft portion rotates in a second direction opposite to said first direction,
    wherein a taper surface is formed at a tip of each of said claw members in an axial direction, and
    wherein said claw members are disposed such that said spool shaft pushes said taper surface in order to move said claw members toward said second positions when said shaft portion penetrates through said recording paper roll.

2. A holder device as recited in claim 1, wherein said claw members are symmetrically disposed with respect to a center of rotation of said shaft portion.

3. A holder device as recited in claim 1, wherein the claw members rotate between the first position and the second position.

4. A holder device as recited in claim 1, wherein said claw members are rotatable relative to the shaft portion, and said first position is a position where said claw member is most protruded into said inner surface of said spool shaft.

5. The holder device as recited in claim 1, wherein, in said second position, said claw members do not protrude into said inner surface of said spool shaft.

6. A holder device as recited in claim 1, wherein said first claw members are two claw members, and said second claw members are two claw members.

7. A holder device as recited in claim 1, wherein said first claw members are symmetrically disposed with respect to a center of rotation of said shaft portion.

8. A holder device as recited in claim 1, wherein said second claw members are symmetrically disposed with respect to a center of rotation of said shaft portion.

9. A holder device as recited in claim 1 further comprising a first flange being in contact with one side face of said recording paper roll in order to neatly align edges of said recording paper.

10. A holder device as recited in claim 9 further comprising an engagement member engaged with said shaft portion, said engagement member comprising:

a second flange being in contact with the other side face of said recording paper roll in order to neatly align edges of said recording paper, said recording paper roll being held between said first flange and said second flange when said engagement member is engaged with said shaft portion.

11. A holder device as recited in claim 10, wherein an engagement groove is formed in said shaft portion, and said engagement member has a core sleeve fitted into said engagement groove.

12. A holder device holding a recording paper roll having a tubular spool shaft and a continuous recording paper wound thereon and rotated together with said recording paper roll by a motor drive, said holder device including a first holder component and a second holder component engaged with each other, said first holder component comprising:

a shaft portion passing through said spool shaft and rotated by said motor drive;

claw members attached to said shaft portion, each of said claw members being movable between a first position in which said claw members protrude into an inner surface of said spool shaft, and a second position in which said claw members are away from said first position with respect to said inner surface of said spool shaft; and springs for biasing said claw members toward said first positions, said claw members being in contact with said inner surface of said spool shaft when said recording paper roll is attached to said holder device, wherein the claw members are disposed such that a rotation of said shaft portion produces a frictional force between said claw members and said inner surface of said spool shaft and engages said claw members with said spool shaft to move said claw members to said first positions, wherein said claw members have first claw members disposed such that said first claw members move to said first positions only when said shaft portion rotates in a first direction, and second claw members disposed such that said second claw members move to said first positions only when said shaft portion rotates in a second direction opposite to said first direction, wherein a taper surface is formed at a tip of each of said claw members in an axial direction, and wherein said claw members are disposed such that said spool shaft pushes said taper surface in order to move said claw members toward said second positions when said shaft portion penetrates through said recording paper roll.

13. A holder device as recited in claim 12, wherein said claw members are symmetrically disposed with respect to a center of rotation of said shaft portion.

14. A holder device as recited in claim 12, wherein the claw members rotate between the first position and the second position.

15. A holder device as recited in claim 12, wherein said first holder component further comprises a first flange being in contact with one side face of said recording paper roll, said second holder component comprises a second flange being in contact with the other side face of said recording paper roll, and said recording paper roll is held between said first and second flanges with edges of said recording paper neatly aligned when said first holder component is engaged with said second holder component.

16. The holder device as recited in claim 12, wherein, in said second position, said claw members do not protrude into said inner surface of said spool shaft.

* * * * *